Aug. 2, 1927. 1,637,525
T. HUSTON
TRACTOR PLOW
Original Filed June 23, 1923   4 Sheets-Sheet 1

Inventor
TOM HUSTON.

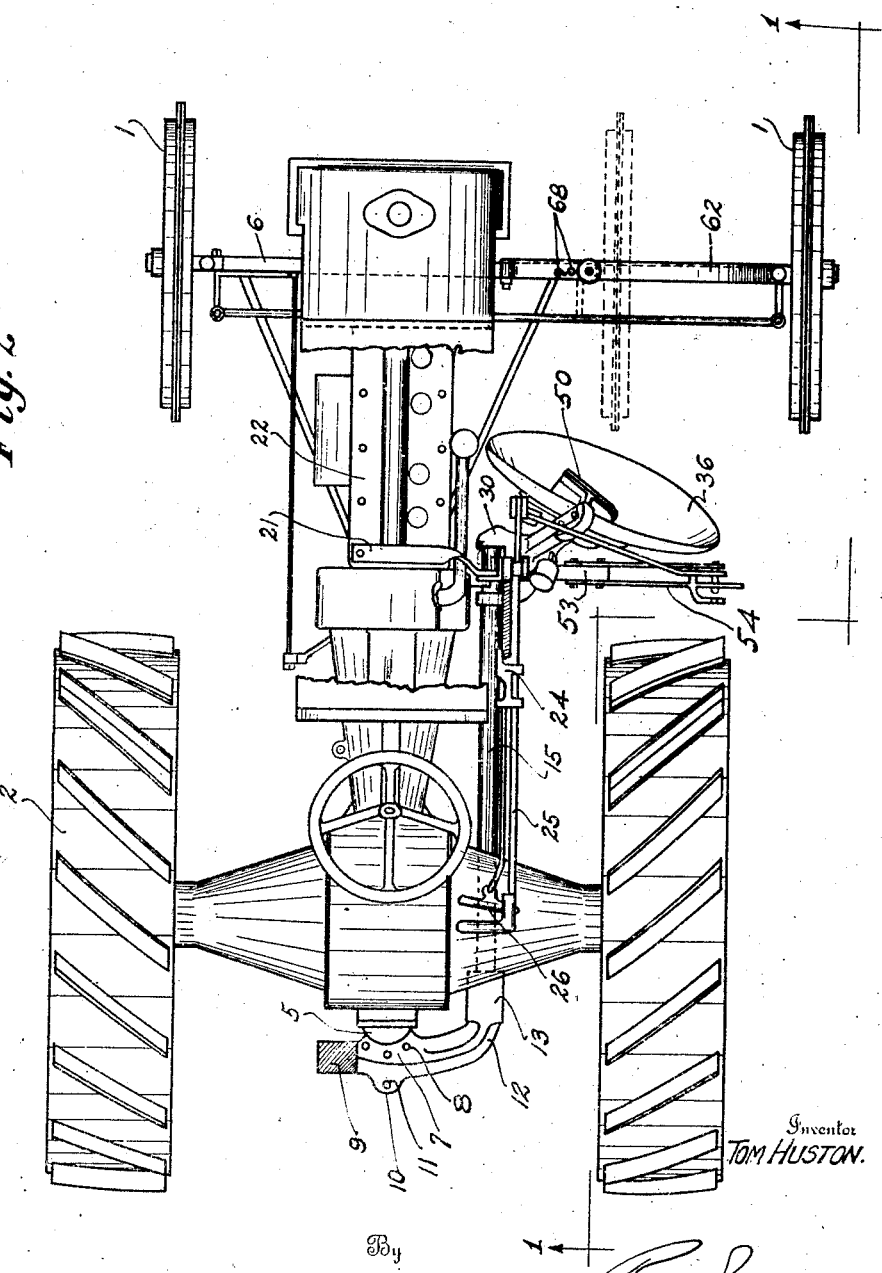

Aug. 2, 1927.
T. HUSTON
1,637,525
TRACTOR PLOW
Original Filed June 23, 1923  4 Sheets-Sheet 3
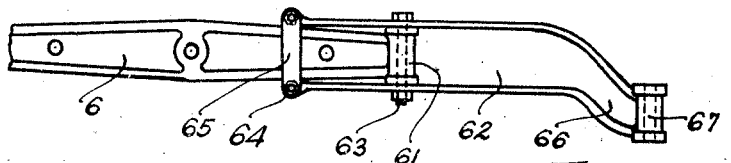
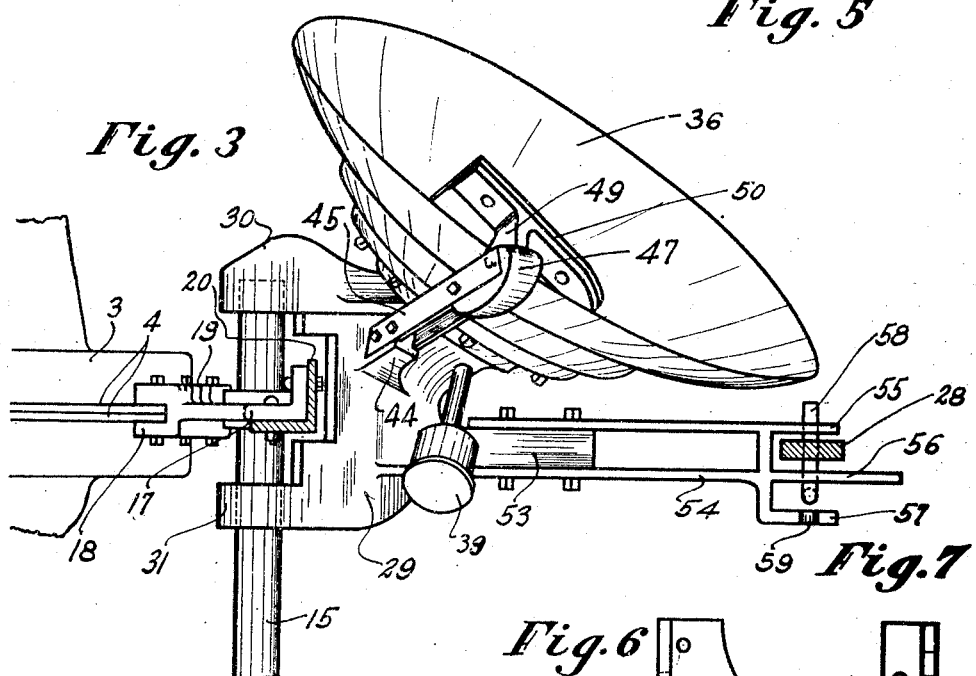
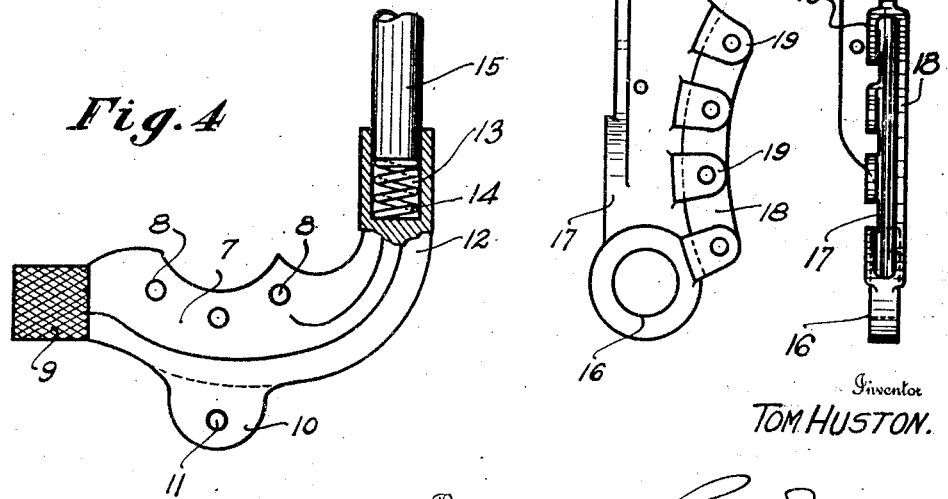
Inventor
TOM HUSTON.
By
Attorney Aug. 2, 1927.
T. HUSTON
1,637,525
TRACTOR PLOW
Original Filed June 23, 1923   4 Sheets-Sheet 4
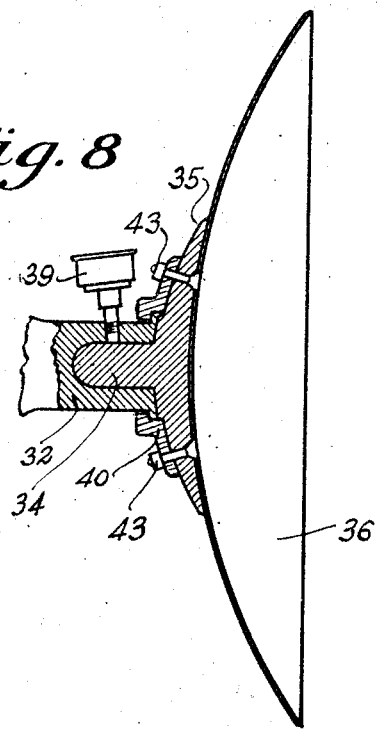
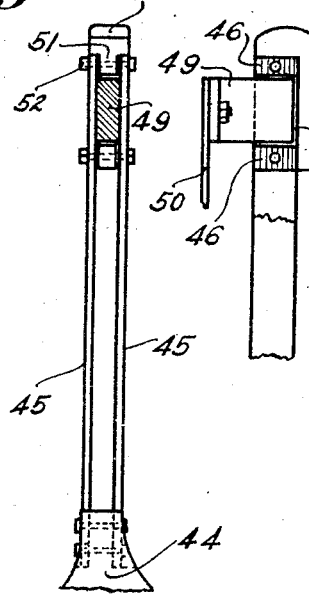
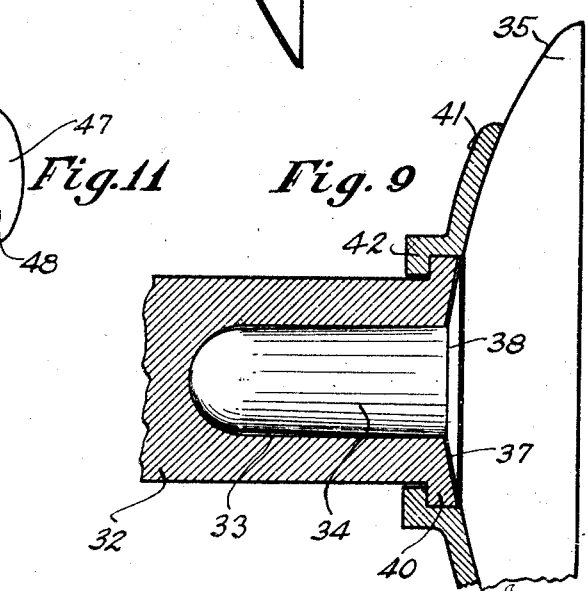
Inventor
TOM HUSTON Patented Aug. 2, 1927.

1,637,525

UNITED STATES PATENT OFFICE.

TOM HUSTON, OF COLUMBUS, GEORGIA, ASSIGNOR TO C. R. MEDLEY, OF COLUMBUS, GEORGIA.

TRACTOR PLOW.

Application filed June 23, 1923, Serial No. 647,210. Renewed October 23, 1926.

My invention relates to a plow attachment for tractors and consists essentially in the provision of novel and effective means designed and adapted to attach a disk plow to a tractor so as to obtain the maximum usefulness, durability and efficiency from the plow while requiring the least possible change in or probability of injury to the tractor.

My invention contemplates the mounting of the plow at the side of the tractor and on the forward end of a thrust bar which at its rear end is connected to the tractor draw bar. My mounting arrangement makes provision for utilizing the weight of the tractor to hold the plow positively in the ground while it permits the plow to be swung about the thrust bar to adjust it.

My invention further contemplates the provision in the thrust bar connections between the tractor draw bar and the plow, of a shock absorber preferably in the form of a compression spring which will absorb shocks without breaking the thrust bar, or the plow or its mounting and without requiring the use of any fragile element or spring connection that might affect the positive working of the thrust bar.

My invention also contemplates utilizing a single large disk plow capable of cutting a furrow approximately of the same width as is now cut by two of the commonly used disks working one behind the other, as by using a single disk plow, the mounting control and manipulation thereof is simplified.

My invention also comprises the novel construction of the swinging plow frame swiveled on the thrust bar and carrying means for rotatably mounting thereon and lubricating the disk plow.

My invention also contemplates the provision of an improved guide bracket for the forward end of the thrust bar having means for effectively attaching it to the tractor housing by making use of the standard bolt holes in the housing flanges, the bracket having novel means which can be most effectively clamped to the housing flanges.

My invention also contemplates the provision of novel means for detachably mounting on the plow frame a scraper for the disk plow.

My invention also contemplates utilizing the supporting bracket for the thrust bar to carry the standard on which the plow adjusting levers are mounted.

My invention also contemplates the provision of novel means for effecting an adjustable extension of the front axle on the plow side by the provision of an extension axle which can be adjustably connected to the standard axle by a pin entering the front axle's knuckle pin bearing and by a clamp at its inner end engaging the front axle where it will afford the desired leverage. By this means I avoid any drilling and weakening of the front axle to clamp the extension axle in adjusted position thereon.

My invention also comprises the novel details of construction and arrangements of parts, which in their preferred embodiment only are illustrated in the accompanying drawings, in which:—

Fig. 2 is a plan view of Fig. 1 with the water tank broken away to show the brace for the lever standards, and with an extension axle applied to the front axle.

Fig. 3 is an enlarged detail plan view of the swinging plow frame, its operating lever and mounting bracket.

Fig. 4 shows the rear end of the thrust bar and its shock absorbing connection to the rear bracket that fastens to the draw bar.

Fig. 5 is a rear elevation of the front extension axle.

Figs. 6 and 7 are detail side and front views of the clamp bracket for supporting the forward end of the thrust bar.

Figs. 8 and 9 are sectional views showing in detail the mounting of the disk in the swinging plow frame.

Figs. 10 and 11 are detail views showing the manner of mounting the scraper in its support on the swinging plow frame.

Similar reference numerals refer to similar parts throughout the drawings.

Figure 1:
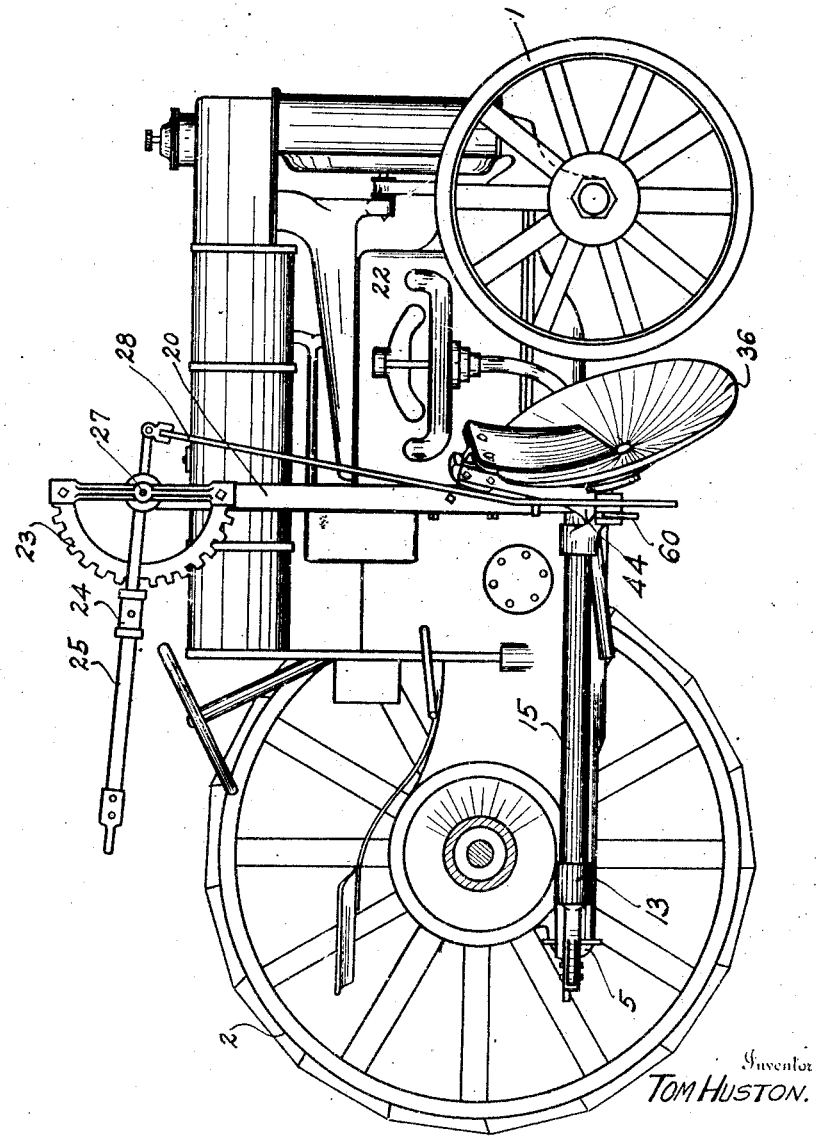
Fig. 1 is a side view of a tractor with one rear wheel broken away showing my improved plow attachment in side elevation.

I show a tractor of the well known type having front wheels 1, rear wheels 2, a housing 3 having flanges bolted together in the usual way, a rear draw bar 5 and a front axle 6, all of which parts are of standard construction and require no modification or change for the application of my plowing attachments. The plowing attachments comprise a rear bracket 7 adapted for attachment to the draw bar 5, the bracket being provided with bolt holes 8 adapted to register with and be bolted through the bolt holes provided in the draw bar. This bracket has at one side a step 9 and at its rear end a lug or eye 10 with a hole 11 therein to provide an attachment for draft rigging of any implement to be drawn behind the tractor. At one side the bracket which is of heavy steel casting is provided with a right angled extension 12 formed with a socket 13 which receives a coil spring 14 and the rear end of a thrust bar 15 which is preferably a pipe with its rear end seated against the spring 14 and free to slide in the socket so as to absorb axial shocks imparted to it. The forward end of the pipe 15, which will hereafter be called the thrust bar, is adapted to be slidably supported in a bearing 16 formed at the lower end of a clamp bracket 17. This bracket has at one side a continuous arcuate rear flange 18 and in spaced relation therewith spring fingers 19, the flange 18 and fingers 19 having aligning bolt holes spaced on centers to correspond to the centers of the bolt holes in the housing flanges. The continuous flange is arranged to abut the rear flange and the fingers 19 overlap the front flange and when bolted thereto are sprung or bent inwardly so as to positively and rigidly clamp the bracket to the housing flanges. At its upper end the bracket 17 is in the shape of an angle iron adapted to receive and have securely bolted to it an angle iron standard 20 which rises vertically beside the machine and at an intermediate point so connected by a brace bar 21 (Fig. 2) to the motor 22, this brace being adapted to be connected by one of the cap screws of the motor head block. At its upper end the bracket has rigid thereon a toothed segment 23 which co-acts with the spring latch or dog 24 mounted on a hand lever 25 and controlled by a grip member 26. The lever is pivoted near its end on a pivot pin 27, its forwardly overhung end being pivotally connected to a bar or rod 28.

The plow is mounted upon a yoke frame 29 having a forward arm 30, formed with a rearwardly opening socket which receives and bears against the forward end of the thrust bar 15, and a rear arm 31 formed with a bearing opening through which the thrust bar 15 passes. The frame is cut away to clear the bracket 17 and the angle standard 18, as will be best seen in Fig. 3. At its forward outside corner the frame is provided with a plow supporting extension 32 in which is formed a socket 33, rounded at its inner end and having cylindrical walls machined to form a bearing for the reception of the journal pin or shank 34 by which the disk backing plate 35 for the disk plow 36 is rotatably mounted in the plow frame.

The forward circumferential edge 37 of the socket is beveled and the length of the pin 34 is such that the beveled boss or shoulder 38 on the plate 35 will stand just free of contact with the face 37. The shank 34 is tapered slightly inwardly, thus causing it to bear for lateral thrust at the outer end only near the shoulder 38 and for end thrust at the inner end only against the concave inner end of the socket. This greatly reduces friction which is further eliminated by a grease cup 39 feeding lubricant into the socket. The extension 32 is provided about its outer end with a circumferential flange 40 and a split retaining ring 41 is provided with flanges 42 which overhang the extension flange 40 and thus serves to hold the plow rotatably mounted in the socket when the split ring, the backing plate and the disk plow are connected together by bolts 43, as shown in Fig. 8. The disk plow is reinforced by the concavo-convex backing plate 35 and is of large diameter as I desire the single large disk to perform the work heretofore done by two disks.

Immediately in the rear of the extension 32 and projecting upwardly and outwardly from the plow frame is a lug 44, the opposite sides of which are reduced to give it an I beam cross section. In the channels thus formed are bolted a pair of bars 45, see Fig. 10, which at their upper ends are received in countersunk seats 46 in the sides of a head block 47. This head block is formed with a seat 48 opening axially of and towards the disk plow and adapted to receive a shank 49 on a scraper blade 50. The thickness of the scraper shank is slightly greater than that of the reduced portions 51 of the block so that when the bolts 52, which connect the bars 45 to the block by passing through the reduced portions 51, are tightened up the bars are drawn against and clamp the scraper shank in position. By loosening the bolts the shank can be readily withdrawn.

Near its rear end the plow carrying frame is provided with a lateral extension 53 to which is bolted a frame 54 having at its outer end three spaced arms 55, 56 and 57. The arm 55 is extended to form a step and the arms 56 and 57 have aligning openings to receive a pin 58 by means of which the lower end of the adjusting bar 28 is made fast to the arm 54. The arm 57 has a slot 59 open at its top and in line with the pin 58 and so disposed that the pin can be inserted or removed only when its downturned angled end 60 is raised into position to pass in or out through the slot. This prevents its accidental displacement.

The front axle 6 is provided with the usual knuckle pin bearing 61 and I provide an extension axle 62 in the form of a channel casting having its upper and lower flanges spaced to receive snugly between them the bearing 61 and to be connected thereto by a bolt 63. At their inner end the extension axle flanges are enlarged to receive transverse bolts 64 which serve to attach a clamp plate 65 thereto so as to clamp and positively engage the axle 6. The extension axle has its free end downturned at 66 and provided with a knuckle pin bearing 67, the duplicate of 61. The flanges of the extension axle are provided with a series of bolt holes 68 (Fig. 2), thus permitting it to be adjusted to overhang more or less beyond the bearing 61 as may be desired.

Having assembled the parts in the manner described, the tractor is started, the lever 25 is raised and the plow frame 29, by means of an adjusting rod 28, is swung outwardly and downwardly about the forward end of the thrust bar 15 until it is in position to plow to the desired depth. The thrust strain of the plow is transmitted from the frame arm 30 to the forward end of the thrust bar and through the thrust bar and spring 14 to the draw bar. Unusual obstructions cause the thrust bar 15 to slide rearwardly in its guide bearings 16 and into the socket 13, compressing the spring and absorbing the shock without the breaking of parts. The axle extension enables the near front wheel to be set to work in the last furrow, its downturned end serving to hold the tractor approximately level. The whole weight of the tractor is transmitted through the bracket 17 to the forward end of the thrust bar 15 and thus serves to hold the plow to its work.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

Having thus described my invention, what I claim as new and desire to secure by Letters Patent, is:—

1. A plow attachment for tractors comprising a thrust bar having means to connect it to the tractor's draw bar, a plow frame disposed between the front and rear tractor axles and having means to mount it on said bar, means to transmit the working thrust of the plow frame to the forward end of said bar, a bracket adapted for rigid connection to the tractor frame and having a bearing for the forward end of said bar, a disk plow mounted on said frame, and means to adjust the frame about the thrust bar's axis.

2. A tractor plow attachment in accordance with claim 1, in which the means for mounting the plow frame on the thrust bar comprises a rearwardly opening socket adapted to receive the forward end of the thrust bar and transmit thereto its thrust strain in an axial direction.

3. A tractor plow attachment in accordance with claim 1, in which the plow frame has a forward socketed member adapted to receive the forward end of the thrust bar and to transmit thereto its direct thrust, and a rear bearing member adapted to transmit its angular thrust to said thrust bar.

4. A tractor plow attachment in accordance with claim 1, in which the thrust bar is mounted free to turn about its long axis in the rear draw bar connection and the front bracket bearing.

5. A tractor plow attachment comprising a plow frame having a cylindrical non-tapering socket and the disk plow having a taper pin fitting in said socket so as to take bearings at the inner and outer ends only of the socket, and means to hold the rotatable plow assembled on the frame.

6. A plowing attachment for tractors comprising a thrust bar, means connected to the tractor draw bar and housing for supporting the ends of said thrust bar, a plow frame mounted only on the forward end of the thrust bar, means to adjust said frame about the axis of the thrust bar, and a single disk plow rotatably mounted in said frame.

7. In a tractor plow attachment, a thrust bar, yielding means to drive said bar from the tractor draw bar, means to support the forward end of the tractor free for longitudinal play, and a plow supporting frame adjustably mounted on the forward end of the draw bar.

8. A tractor plow attachment in accordance with claim 7, in which the yielding means to drive the thrust bar from the tractor draw bar comprise a bracket having means to attach it to the draw bar and provided with a forwardly extending socket, and a coil spring mounted in said socket, the rear end of the thrust bar being free to slide in said socket against the action of said spring.

9. In combination with a tractor having a rear draw bar and flanged housings, of a bracket bolted to the draw bar, a tubular thrust bar having its rear end engaging said bracket, a forward bearing bracket for the thrust bar bolted to said housing flanges, a plow frame having arms engaging the thrust bar on both sides of said bearing bracket, means to adjust said frame about the axis of said thrust bar, and means to mount a plow on said frame.

10. A plow attachment for tractors according to claim 9, in which the forward plow frame arm has a socket that receives the forward end of the thrust bar, and the rear plow frame arm has a bearing through which the thrust bar passes.

11. A tractor plow attachment comprising, in combination, a bracket adapted to be bolted to the draw bar of the tractor and having a yielding bearing, a thrust bar having its rear end received in said bearing, a bracket adapted to be clamped to the tractor housing and having a guide bearing for the forward end of the thrust bar, a plow frame mounted entirely on the forward end of the thrust bar free to swing about the axis of said bar, lever operated means to adjust the plow frame, and means to mount a single disk plow on said frame.

12. A tractor plow attachment according to claim 9, in which the forward bearing bracket supports a standard on which the plow adjusting lever operating means is mounted.

13. In a tractor plow attachment, a forward bearing bracket for the thrust bar, comprising members adapted to straddle the tractor housing flanges and to be bolted to said housing flanges.

14. A tractor plow attachment bracket according to claim 13, in which the bracket member engaging the rear housing flange is formed by a solid curved plate, while the members engaging the front housing flange are spaced, yieldable clamp fingers.

15. In a tractor plow attachment, a swinging plow frame formed by an integral casting having spaced thrust bar engaging elements, means for the attachment thereto of a plow and an operating arm, and means to transmit thrust from the tractor draw bar to said tractor frame.

16. A plow attachment in accordance with claim 15, in combination with a bracket mounted on the tractor and interposed between the thrust bar engaging elements of the plow frame, and a thrust bar mounted in the bracket and engaging said elements.

In testimony whereof I affix my signature.

TOM HUSTON.